United States Patent [19]

Cormier et al.

[11] 4,017,590

[45] Apr. 12, 1977

[54] PREPARATION OF SYNTHETIC FERRIERITE

[75] Inventors: William E. Cormier, Worcester; Leonard B. Sand, Holden, both of Mass.

[73] Assignee: Zeochem Corporation, Worcester, Mass.

[22] Filed: Apr. 15, 1976

[21] Appl. No.: 677,263

Related U.S. Application Data

[63] Continuation of Ser. No. 469,660, May 14, 1974, abandoned.

[52] U.S. Cl. .............................. 423/329; 423/328
[51] Int. Cl.$^2$ ........................................ C01B 33/28
[58] Field of Search .......... 423/329, 328, 330, 118; 252/455 Z

[56] References Cited

UNITED STATES PATENTS

| 3,030,181 | 4/1962 | Milton | 423/328 |
| 3,247,195 | 4/1966 | Kerr | 423/328 X |

OTHER PUBLICATIONS

Wise et al. "The American Mineralogist" vol. 54, 1969, pp. 887–895.
Barrer et al. "The American Mineralogist" vol. 50, 1965, pp. 484–489.
Barrer et al. "Chemical Society Journal" 1964, pt. 1, pp. 485–497.
Barrer et al. "Chemical Society Journal" 1948, pp. 2158–2163.

*Primary Examiner*—Edward J. Meros
*Attorney, Agent, or Firm*—Norman S. Blodgett; Gerry A. Blodgett

[57] ABSTRACT

Synthetic Na,K-ferrierite, a molecular sieve zeolite capable of intracrystalline adsorption of molecules, is prepared by hydrothermal synthesis in the water, soda, potash, alumina, silica system. Crystallization is best achieved in the temperature range of 230°–310° C and autoclaving times of 2–96 hours with the use of co-precipitated silica-alumina gels and Na and K carbonates and bicarbonates.

1 Claim, 4 Drawing Figures

PREPARATION OF SYNTHETIC FERRIERITE

This is a continuation, of application Ser. No. 469,660 filed May 14, 1974, now abandoned.

BACKGROUND OF THE INVENTION

Ferrierite is of interest as a molecular sieve zeolite due to channels formed by 10-membered rings parallel to the c-axis (1,2). It occurs naturally in the exchange varieties, per 1 Al content as $Na_{0.23}K_{0.04}Mg_{0.36}$ at Kamloops Lake, B.C. with quartz and calcite (1,3): as $Na_{0.21}K_{0.49}Mg_{0.06}Ca_{0.09}$ at Lovelock, Nevada with mordenite and tridymite (4); as $Na_{0.03}K_{0.06}Mg_{0.35}Ca_{.12}$ per 1 (Al + Fe′′′) at Vicenza, Italy with calcite (5) and as $Na_{0.41}K_{0.32}Mg_{0.14}$ at Agoura, California with quartz, calcite and clinoptilolite (6).

Synthesis of Sr-ferrierite has been reported by Barrer and Marshall (7) in the temperatue range 340°–380° C from aqueous gels of composition $SrO·Al_2O_3·7-9SiO_2$. Hawkins (8) synthesized Sr- and Ca-ferrierite in the temperature range 350°–370° C from co-precipitating gels using nitrates of calcium, strontium and aluminum and Ludox colloidal silica sol. Senderov (9) reported the synthesis of Na-ferrierite within the temperature range studied of 150°–350° C from silica gel, sodium aluminate and sodium hydroxide in mixtures giving a 10 silica:1 alumina ration with slight excess of $Na_2O$ and the sum of oxides was about 10% of the total water content. Na-ferrierite was reported as a coexisting phase with mordenite by Sand (10) but no conditions for its synthesis were given.

All of these syntheses either involve high temperatures, uncommon starting materials or lack of detail as to published process parameters.

These and other difficulties experienced with the prior art processes have been obviated in a novel manner by the present invention.

It is therefore, an outstanding object of the invention to provide a process for synthesizing a ferrierits, an intermediate port zeolite that can be used to separate molecules of 6.2 A diameter from large molecules.

Another object of this invention is the provision of a process for synthesizing ferrierite which involves readily available starting materials, reasonably low temperatures and short times.

With the foregoing and other objects in view which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

Conditions are developed for the crystallization of Na,K-ferrierites. A complete series exists between the end member Na- and K-ferrierites with crystallization optimum at intermediate Na/K ratios. The metastable ferrierites convert either to an intermediate mordenite phase or directly to feldspar and quartz. Isothermal phase transformation diagrams are given to show the kinetics of crystallization and transformation of ferrierite as a function of Na/K and $CO_3/HCO_3$ ratios in the batch composition.

Crystallization was best achieved in the temperature range 230°–310° C and autoclaving times of 2–96 hours with the use of co-precipitating silica-alumina gels and Na and K carbonates and bicarbonates. In the systems studied the critical parameter necessary to yield ferrierite is the presence of bicarbonate in the batch composition producing carbon dioxide during reaction with a $CO_3/HCO_3$ buffer pair most effective.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Reactor vessels used were low carbon 304 stainless steel of 15 ml. capacity of modified Morey design. Silver seals were used for closure. Materials used to charge the autoclave were co-precipitated silica-alumina gels made from aluminum chloride and sodium silicate solutions, sodium carbonate (analytical reagent grade), sodium bicarbonate (reagent grade), potassium carbonate (reagent grade) and potassium bicarbonate (U.S.P. grade). The system $Na_2O·K_2O·Al_2O_3·SiO_2·H_2O·CO_3.HCO_3$ was chosen for investigation because of the common association of carbonate with natural ferrierite, the occurrence of Na, K-ferrierite in large deposits, the reactivity of the alkali system, and from previous experience in the Na system. The salts were mixed with the gel in a mortar and pestle, water added and mulled quickly, charged and sealed in the autoclave as quickly as possible to avoid loss of carbon dioxide. The sealed vessels were placed at time zero in fan circulated ovens at temperature. The vessels were water quenched immediately on removal from the oven. Reproducible results were obtained with this technique.

The products were identified with a Norelco X-ray diffractometer with monochromator attachment. Aluminum powder was used as an internal standard to obtain the XRD data for the synthetic ferrierite as compared with others. Sorption values were obtained in a constant volume monometer-reading glass unit using a sample bed of 1.5 mm. height and 1.5 mm. diameter.

Figure 1:
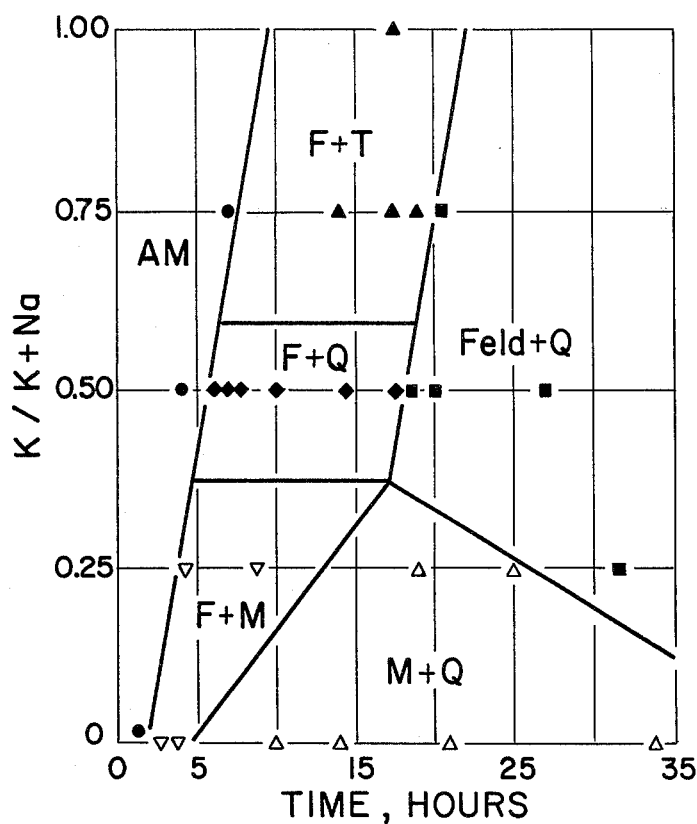
FIG. 1 is an isothermal phase transformation diagram on bath composition $3.26(Na,K)_2O-Al_2O_3-13.5SiO_2-130.4H_2O-0.82CO_3-4.88HCO_3$ run at 280° C, AM = X-ray amorphous, F = ferrierite, M = mordenite, Feld = feldspar, T = tridymite, Q = quartz.

Contrasted with results obtained in the $Na_2O$ system, it was found that the combination of adding both $K_2O$ and the $HCO_3/CO_3$ pair gave a system easily producing ferrierite as a phase and which could be systematically delineated. As ferrierite was observed to be a metastable phase in the system, it was decided to study the kinetics of ferrierite crystallization and isothermal phase transformations as a function of both Na/K ratios and $HCO_3/CO_3$ ratios present in the reacting system. A batch composition was chosen higher in silica than necessary to produce ferrierite as a single crystalline phase so the associated silica phase could be observed. FIG. 1 graphs the results obtained on batch compositions varying only the Na/K ratios under autogenous pressure at 280° C as a function of time. The metastable formation of ferrierite is evident and explains clearly the coexistence of ferrierite and mordenite along with a silica polymorph in the naturally occurring deposits. Holding the $CO_3/(CO_3 + (HCO_3)_2)$ ratio at 0.25, ferrierite was obtained as a phase in the end member $Na_2O$ and $K_2O$ systems and on intermediate Na/K ratios. Feldspar and quartz were observed as the equilibrium phases in the system.

Figure 2:
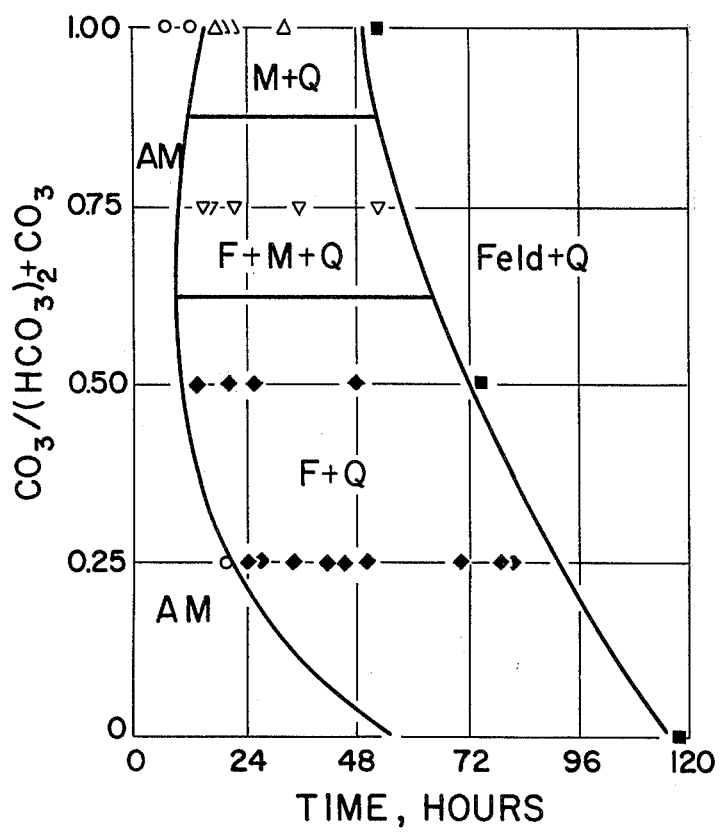
FIG. 2 is an isothermal phase transformation diagram on batch composition $1.63Na_2O-1.63K_2O-Al_2O_3-13.5SiO_2-130.4H_2O-(6.52HCO_3$ to $3.26CO_3)$, run at 245° C, AM = X-ray amorphous, F = ferrierite, M = mordenite, Feld = feldspar, Q = quartz.

In FIG. 2 are plotted the results where the Na/K ratio was held constant at 0.5 and the $HCO_3/CO_3$ ratio varied on a batch composition run under autogenous pressure at 245° C as a function of time. Similar results were obtained except for the slower kinetics of the system at lower temperature and that ferrierite was not obtained as a phase at the low $HCO_3/CO_3$ ratios in the batch composition. Feldspar and quartz also were observed as the equilibrium phases.

Figure 3:
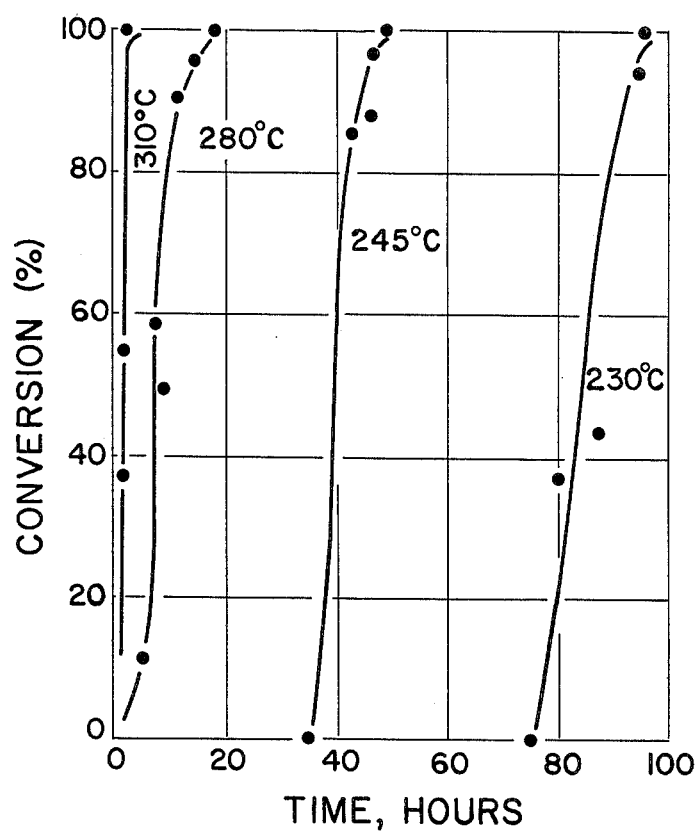
FIG. 3 is a graph of crystallization curves for ferrierite on batch composition $1.63Na_2O-1.63K_2O-Al_2O_3-13.5SiO_2-130.4H_2O-0.82CO_3-4.88HCO_3$.
Figure 4:
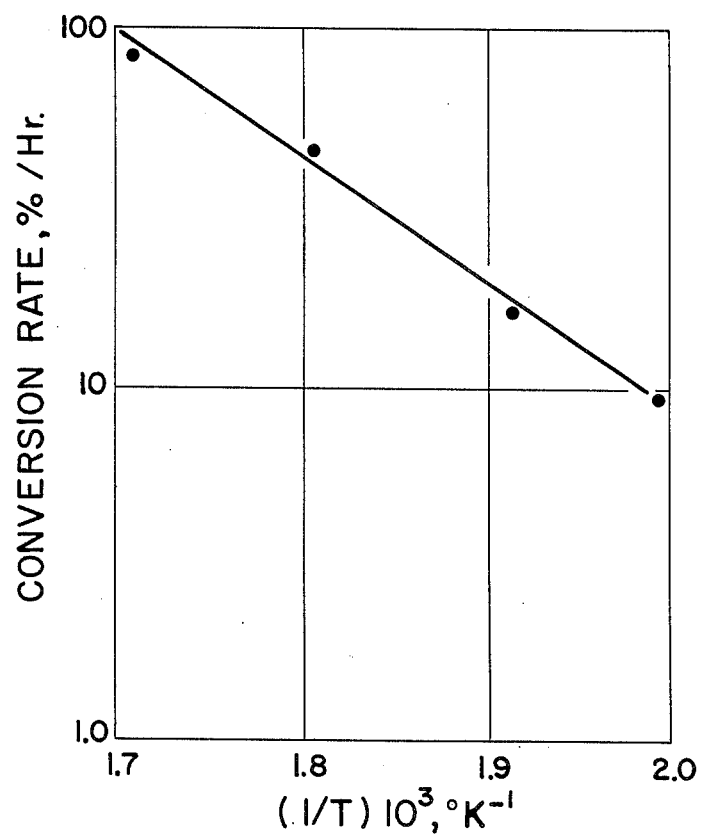
FIG. 4 is an arrhenius plot obtained from curves in FIG. 3.

In FIG. 3 are plotted the crystallization curves for ferrierite synthesized at four temperatures, and in FIG. 4 is the graph of the Arrhenius plot from which an activation energy of 16.7Kcal/gmol was calculated.

In Table 1 are presented the X-ray powder diffraction data obtained on a ferrierite synthesized from a batch composition $1.63Na_2O\text{-}1.63K_2O\text{-}13.5SiO_2\text{-}260.8H_2O\text{-}0.82CO_3\text{-}4.88HCO_3$ reacted at 280° C for 18 hours. At 25° C the crystals sorbed 0.5 wt. % of spec grade isohexane at 0.45 partial pressure and 0.39 wt. % spec grade benzene at 0.40 partial pressure.

TABLE 1:

X-ray powder diffraction data of synthetic ferrierite produced from batch composition $1.63Na_2O\text{-}1.63K_2O\text{-}Al_2O_3\text{-}13.5SiO_2\text{-}260.8H_2O\text{-}0.82CO_3\text{-}4.88HCO_3$ at 280° C, 18 hours, compared with other reported data.

| N,K-Synthetic | | Agoura (6) | | Kamloops (12) | | Senderov (9) | |
|---|---|---|---|---|---|---|---|
| d | I | d | I | d | I | d | I |
| 11.34 | 8 | 11.33 | 3 | 11.33 | 2 | | |
| 9.55 | 75 | 9.47 | 50 | 9.61 | 10 | 9.57 | 10 |
| 7.13 | 52 | 7.07 | 38 | 7.00 | 3 | 7.12 | 2 |
| 6.65 | 25 | 6.59 | 3 | 6.61 | 2 | 6.70 | 2 |
| 5.75 | 20 | 5.75 | 15 | 5.84 | 5 | | |
| 5.69 | 23 | 5.64 | 14 | | | 5.66 | 4 |
| | | | | 4.96 | 1— | | |
| 4.82 | 8 | 4.75 | 2 | 4.80 | 1— | | |
| | | 4.56 | 1 | 4.58 | 1— | 4.54 | 1 |
| 3.992 | 43 | 3.977 | 35 | 3.99 | 9 | 4.00 | 8 |
| 3.931 | 30 | 3.943 | 35 | | | | |
| | | | | 3.88 | 1 | | |
| 3.785 | 54 | 3.778 | 65 | 3.79 | 2 | 3.76 | 6 |
| 3.652 | 33 | 3.661 | 12 | 3.69 | 5 | 3.66 | 4 |
| 3.550 | 100 | 3.537 | 100 | 3.54 | 8 | 3.57 | 5 |
| 3.477 | 92 | 3.400 | 18 | 3.47 | 8 | 3.49 | 7 |
| | | | | 3.42 | 2 | 3.40 | 6 |
| 3.324 | 21 | 3.313 | 35 | 3.31 | 2 | 3.33 | 1 |
| | | | | 3.20 | 1 | 3.22 | 4 |
| 3.134 | 42 | 3.140 | 12 | 3.15 | 3 | 3.15 | 4 |
| | | | | 3.07 | 3 | 3.06 | 2 |
| 3.031 | 32 | 3.048 | 12 | | | | |
| | | | | 2.97 | 3 | | |
| 2.947 | 8 | 2.945 | 11 | | | 2.91 | 5 |
| 2.650 | 7 | 2.644 | 7 | 2.64 | 2 | 2.69 | 1 |
| 2.583 | 7 | 2.582 | 10 | 2.58 | 3 | 2.57 | 1 |
| 2.477 | 10 | | | | | | |

The ability of synthetic ferrierite to selectively sorb branched chain from cyclic hydrocarbons is possible. This molecular sieving property would be due to the presence of 10-membered rings in the channel pore system. This had been classified previously (11) as an intermediate port zeolite between small port (8-membered rings) zeolites of 3–5 A effective diameter not sorbing branched chain hydrocarbons and the large port (12-membered rings) zeolites which sorb the cyclic hydrocarbons.

Table 2 presents data on the various experimental runs. In the following table, the meanings of the symbols are as follows: N=$Na_2O$; K=$K_2O$; A=$Al_2O_3$; S=$SiO_2$; H=$H_2O$; $CO_3$ = carbonate; $HCO_3$ = bicarbonate.

TABLE 2

TYPICAL RUNS

| Batch | | | | | | | T° C | t(hrs) | Results |
|---|---|---|---|---|---|---|---|---|---|
| $N_{1.63}$ | $K_{1.63}$ | A | $S_{13.5}$ | $H_{130.4}$ | $(CO_3)_{.82}$ | $(HCO_3)_{4.88}$ | 280 | 17 | ferrierite & quartz, mordenite |
| $N_{1.63}$ | $K_{1.63}$ | A | $S_{13.5}$ | $H_{130.4}$ | $(CO_3)_{.82}$ | $(HCO_3)_{4.88}$ | 280 | 6 | ferrierite & amorphous |
| $N_{1.63}$ | $K_{1.63}$ | A | $S_{13.5}$ | $H_{130.4}$ | $(CO_3)_{.82}$ | $(HCO_3)_{4.88}$ | 280 | 20 | quartz feldspar |
| $N_{1.63}$ | $K_{1.63}$ | A | $S_{13.5}$ | $H_{130.4}$ | $(CO_3)_{.82}$ | $(HCO_3)_{4.88}$ | 245 | | |
| $N_{1.63}$ | $K_{1.63}$ | A | $S_{13.5}$ | $H_{130.4}$ | $(CO_3)_{.82}$ | $(HCO_3)_{4.88}$ | 245 | | ferrierite & amorphous |
| $N_{1.63}$ | $K_{1.63}$ | A | $S_{13.5}$ | $H_{130.4}$ | $(CO_3)_{.82}$ | $(HCO_3)_{4.88}$ | 245 | | |
| $N_{1.63}$ | $K_{1.63}$ | A | $S_{13.5}$ | $H_{130.4}$ | $(CO_3)_{.82}$ | $(HCO_3)_{4.88}$ | 230 | 96 | ferrierite & tridymite |
| $N_{1.63}$ | $K_{1.63}$ | A | $S_{13.5}$ | $H_{130.4}$ | $(CO_3)_{.82}$ | $(HCO_3)_{4.88}$ | 230 | 80 | ferrierite & amorphous |
| $N_{1.63}$ | $K_{1.63}$ | A | $S_{13.5}$ | $H_{130.4}$ | $(CO_3)_{.82}$ | $(HCO_3)_{4.88}$ | 230 | 101½ | ferrierite & tridymite |
| $N_{1.63}$ | $K_{1.63}$ | A | $S_{13.5}$ | $H_{130.4}$ | $(CO_3)_{.82}$ | $(HCO_3)_{4.88}$ | 310 | 3 | ferrierite & tridymite |
| $N_{1.63}$ | $K_{1.63}$ | A | $S_{13.5}$ | $H_{130.4}$ | $(CO_3)_{.82}$ | $(HCO_3)_{4.88}$ | 310 | 1½ | ferrierite & tridymite |
| $N_{1.63}$ | $K_{1.63}$ | A | $S_{13.5}$ | $H_{130.4}$ | $(CO_3)_{.82}$ | $(HCO_3)_{4.88}$ | 310 | 4 | quartz, tridymite, ferrierite |
| $N_{2.44}$ | $K_{.82}$ | A | $S_{13.5}$ | $H_{130.4}$ | $(CO_3)_{.82}$ | $(HCO_3)_{4.88}$ | 280 | 9 | ferrierite, mordenite |
| $N_{.82}$ | $K_{2.44}$ | A | $S_{13.5}$ | $H_{130.4}$ | $(CO_3)_{.82}$ | $(HCO_3)_{4.88}$ | 280 | 14 | ferrierite, tridymite |
| | $K_{3.26}$ | A | $S_{13.5}$ | $H_{130.4}$ | $(CO_3)_{.82}$ | $(HCO_3)_{4.88}$ | 280 | 10½ | ferrierite, tridymite |
| $N_{1.63}$ | $K_{1.63}$ | A | $S_{13.5}$ | $H_{130.4}$ | $(CO_3)_{2.44}$ | $(HCO_3)_{1.63}$ | 245 | 36 | ferrierite, mordenite |

TABLE 2-continued

TYPICAL RUNS

| Batch | | | | | | | T°C | t(hrs) | Results |
|---|---|---|---|---|---|---|---|---|---|
| $N_{1.63}$ | $K_{1.63}$ | A | $S_{13.5}$ | $H_{130.4}$ | $(CO_3)_{1.63}$ | $(HCO_3)_{3.26}$ | 245 | 20 | ferrierite & amorphous |
| $N_{3.26}$ | | A | $S_{13.5}$ | $H_{130.4}$ | $(CO_3)_{1.63}$ | $(HCO_3)_{3.26}$ | 230 | 13 | ferrierite & tridymite |
| $N_{1.63}$ | $K_{1.63}$ | A | $S_{13.5}$ | $H_{130.4}$ | $(CO_3)_{1.63}$ | $(HCO_3)_{3.26}$ | 280 | 17 | quartz, tridymite, ferrierite |
| | $K_{3.26}$ | A | $S_{13.5}$ | $H_{130.4}$ | $(CO_3)_{1.63}$ | $(HCO_3)_{3.26}$ | 280 | 75 | quartz, ferrierite |
| | $K_{3.26}$ | A | $S_{13.5}$ | $H_{130.4}$ | $(CO_3)_{.82}$ | $(HCO_3)_{4.88}$ | 245 | 21 | ferrierite, tridymite, quartz |
| | $K_{3.26}$ | A | $S_{13.5}$ | $H_{65.2}$ | $(CO_3)_{.82}$ | $(HCO_3)_{4.88}$ | 280 | 9 | ferrierite & quartz |
| $N_{.88}$ | $K_{2.64}$ | A | $S_{10.47}$ | $H_{211.2}$ | $(CO_3)_{.66}$ | $(HCO_3)_{3.96}$ | 280 | 9 | ferrierite & quartz |
| $N_{1.50}$ | $K_{1.50}$ | A | $S_{10.47}$ | $H_{240.0}$ | $(CO_3)_{.53}$ | $(HCO_3)_{3.18}$ | 280 | 10 | ferrierite & quartz |
| $N_{3.00}$ | $K_{3.00}$ | A | $S_{10.0}$ | $H_{360.0}$ | $(CO_3)_{3.00}$ | $(HCO_3)_{6.00}$ | 280 | 20 | ferrierite, tridymite |
| $N_{1.75}$ | $K_{1.75}$ | A | $S_{10.0}$ | $H_{140.0}$ | $(CO_3)_{.88}$ | $(HCO_3)_{5.24}$ | 230 | 48 | ferrierite & amorphous |
| $N_{.82}$ | $K_{2.44}$ | A | $S_{13.5}$ | $H_{130.4}$ | $(CO_3)_{.82}$ | $(HCO_3)_{4.88}$ | 280 | 17 | ferrierite |
| $N_{.82}$ | $K_{2.44}$ | A | $S_{13.5}$ | $H_{195.6}$ | $(CO_3)_{5.7}$ | | 280 | 18 | ferrierite |
| $N_{1.63}$ | $K_{1.63}$ | A | $S_{13.5}$ | $H_{260.8}$ | $(CO_3)_{.82}$ | $(HCO_3)_{2.44}$ | 280 | 17 | ferrierite & amorphous |
| $N_{0.75}$ | $K_{0.75}$ | A | $S_{13.5}$ | $H_{60.0}$ | $(CO_3)_{.75}$ | $(HCO_3)_{1.50}$ | 280 | 17 | ferrierite & mordenite |
| $N_{0.75}$ | $K_{0.75}$ | A | $S_{13.5}$ | $H_{90.0}$ | $(CO_3)_{.75}$ | $(HCO_3)_{1.50}$ | 280 | 12 | quartz, ferrierite |
| $N_{1.50}$ | $K_{1.50}$ | A | $S_{10.47}$ | $H_{120.0}$ | $(CO_3)_{.53}$ | $(HCO_3)_{3.18}$ | 280 | 20 | ferrierite & quartz (14%) |
| | $K_{3.67}$ | A | $S_{10.38}$ | $H_{146.9}$ | $(CO_3)_{0.92}$ | $(HCO_3)_{5.52}$ | 280 | 24 | ferrierite |
| $N_{0.92}$ | $K_{2.76}$ | A | $S_{10.38}$ | $H_{146.9}$ | $(CO_3)_{0.92}$ | $(HCO_3)_{5.52}$ | 280 | 20 | ferrierite & quartz (7%) |
| $N_{1.84}$ | $K_{1.84}$ | A | $S_{10.38}$ | $H_{146.9}$ | $(CO_3)_{0.92}$ | $(HCO_3)_{5.52}$ | 280 | 24.5 | ferrierite |
| $N_{2.76}$ | $K_{0.92}$ | A | $S_{10.38}$ | $H_{146.9}$ | $(CO_3)_{0.92}$ | $(HCO_3)_{5.52}$ | 280 | 27 | ferrierite & mordenite (wk) |
| $N_{3.67}$ | | A | $S_{10.38}$ | $H_{146.9}$ | $(CO_3)_{0.92}$ | $(HCO_3)_{5.52}$ | 280 | 11.5 | ferrierite & quartz (6%) |
| $N_{1.84}$ | $K_{1.84}$ | A | $S_{10.38}$ | $H_{146.9}$ | $(CO_3)_{1.84}$ | $(HCO_3)_{3.68}$ | 280 | 7 | ferrierite & quartz (11%) |
| $N_{1.84}$ | $K_{1.84}$ | A | $S_{10.38}$ | $H_{146.9}$ | $(CO_3)_{2.76}$ | $(HCO_3)_{1.84}$ | 280 | 7 | ferrierite & quartz (25%) |
| $N_{1.84}$ | $K_{1.84}$ | A | $S_{10.38}$ | $H_{146.9}$ | $(CO_3)_{3.68}$ | | 280 | 9 | ferrierite & quartz (5%) |
| $N_{1.5}$ | $K_{1.5}$ | A | $S_{10.47}$ | $H_{240.0}$ | $(CO_3)_{0.53}$ | $(HCO_3)_{3.18}$ | 280 | 12 | ferrierite & quartz (3%) |
| $N_{2.25}$ | $K_{0.75}$ | A | $S_{10.47}$ | $H_{240.0}$ | $(CO_3)_{0.53}$ | $(HCO_3)_{3.18}$ | 280 | 10 | ferrierite |
| $N_{3.0}$ | | A | $S_{10.47}$ | $H_{240.0}$ | $(CO_3)_{0.53}$ | $(HCO_3)_{3.18}$ | 280 | 14 | ferrierite & quartz (4%) |
| $N_{0.88}$ | $K_{2.12}$ | A | $S_{10.47}$ | $H_{240.0}$ | $(CO_3)_{0.53}$ | $(HCO_3)_{3.18}$ | 280 | 24 | ferrierite |
| $N_{1.5}$ | $K_{1.5}$ | A | $S_{10.47}$ | $H_{240.0}$ | | $(HCO_3)_{4.24}$ | 280 | 8.5 | ferrierite & quartz (6%) |
| $N_{1.5}$ | $K_{1.5}$ | A | $S_{10.47}$ | $H_{240.0}$ | $(CO_3)_{1.06}$ | $(HCO_3)_{2.12}$ | 280 | 10 | ferrierite & quartz (6%) |
| $N_{1.5}$ | $K_{1.5}$ | A | $S_{10.47}$ | $H_{240.0}$ | $(CO_3)_{0.80}$ | $(HCO_3)_{2.64}$ | 280 | 7 | ferrierite & quartz (24%) |
| $N_{1.5}$ | $K_{1.5}$ | A | $S_{10.47}$ | $H_{240.0}$ | $(CO_3)_{1.59}$ | $(HCO_3)_{1.06}$ | 280 | 6 | ferrierite & quartz (23%) |
| $N_{1.5}$ | $K_{1.5}$ | A | $S_{10.47}$ | $H_{240.0}$ | $(CO_3)_{2.12}$ | | 256 | 9 | ferrierite |
| $N_{1.5}$ | $K_{1.5}$ | A | $S_{10.47}$ | $H_{240.0}$ | $(CO_3)_{0.53}$ | $(HCO_3)_{3.18}$ | 256 | 17 | ferrierite |
| $N_{2.0}$ | $K_{2.0}$ | A | $S_{10.47}$ | $H_{160.0}$ | $(CO_3)_{0.78}$ | $(HCO_3)_{4.68}$ | 280 | 12 | ferrierite |
| $N_{2.0}$ | $K_{2.0}$ | A | $S_{10.47}$ | $H_{160.0}$ | $(CO_3)_{0.78}$ | $(HCO_3)_{4.68}$ | 280 | 12 | ferrierite & quartz |
| $N_{0.88}$ | $K_{3.28}$ | A | $S_{10.47}$ | $H_{165.6}$ | $(CO_3)_{0.82}$ | $(HCO_3)_{4.88}$ | 280 | 12 | ferrierite & quartz |
| $N_{0.88}$ | $K_{2.64}$ | A | $S_{10.47}$ | $H_{140.8}$ | $(CO_3)_{0.67}$ | $(HCO_3)_{3.96}$ | 280 | 12 | ferrierite & quartz |
| $N_{1.5}$ | $K_{1.5}$ | A | $S_{10.47}$ | $H_{120.0}$ | $(CO_3)_{0.53}$ | $(HCO_3)_{3.18}$ | 256 | 22 | ferrierite |
| $N_{1.63}$ | $K_{1.63}$ | A | $S_{11.1}$ | $H_{130.4}$ | $(CO_3)_{0.82}$ | $(HCO_3)_{4.88}$ | 280 | 21 | ferrierite |
| $N_{1.63}$ | $K_{1.63}$ | A | $S_{11.1}$ | $H_{130.4}$ | $(CO_3)_{0.82}$ | $(HCO_3)_{4.88}$ | 280 | 16.5 | ferrierite |
| $N_{3.26}$ | | A | $S_{11.1}$ | $H_{130.4}$ | $(CO_3)_{0.82}$ | $(HCO_3)_{4.88}$ | 280 | 16.5 | ferrierite & quartz (4%) |
| $N_{2.44}$ | $K_{0.82}$ | A | $S_{11.1}$ | $H_{130.4}$ | $(CO_3)_{0.82}$ | $(HCO_3)_{4.88}$ | 280 | 16.5 | ferrierite & quartz (9%) |
| $N_{0.82}$ | $K_{2.44}$ | A | $S_{11.1}$ | $H_{130.4}$ | $(CO_3)_{0.82}$ | $(HCO_3)_{4.88}$ | 280 | 19 | ferrierite & quartz (6%) |
| | $K_{3.26}$ | A | $S_{11.1}$ | $H_{130.4}$ | $(CO_3)_{1.63}$ | $(HCO_3)_{3.26}$ | 280 | 16 | ferrierite & quartz (6%) |
| $N_{1.63}$ | $K_{1.63}$ | A | $S_{11.1}$ | $H_{130.4}$ | $(CO_3)_{2.44}$ | $(HCO_3)_{1.63}$ | 280 | 10.5 | ferrierite & quartz (15%) |

The following is a list of literature cited herein:
1. Vaughan, P. A., Acta Cryst. (1966), 21, 983.
2. Kerr, I. S., Nature (1966), 210, 294.
3. Graham, R. P. D., Trans. Roy. Soc. Canada (1918), 12, 185.
4. Sand, L. B. and A. J. Regis, G.S.A. Annual Mtgs. (1966), 189 (abstract).
5. Alietti, A., Passaglia, E. and G. Scaini, Amer. Miner. (1967), 52, 1562.
6. Wise, W. S., Nokleberg, W. J. and Kokinos, Amer. Miner. (1969), 54, 887.
7. Barrer, R. M. and Marshall, D. J., Amer. Miner. (1965), 50, 484.
8. Hawkins, D. B., Mat. Res. Bull. (1967), 2, 1021.
9. Senderov. E. E., Geochemistry (1963), 9, 848.
10. Sand, L. B., Molecular Sieves, 71–77, Society of Chemical Industry, Spec. Publ., London, 1968.
11. Sand, L. B., Ec. Geol. in Mass., 191–198, Univ. Mass. Grad. School, 1967.
12. Staples, L. W., Amer. Miner. (1955), 40, 1095.

While it will be apparent that the illustrated embodiments of the invention herein disclosed are well calculated adequately to fulfill the objects and advantages primarily stated, it to be understood that the invention is susceptible to variation, modification, and change within the spirit and scope of the subjoined claims.

The invention having been thus described, what is claimed as new and desired to secure by Letters Patent is:

1. A method of synthesizing a zeolite having the structure of ferrierite, comprising the steps of:
    a. preparing a mixture including a source of silicon, a source of aluminum, a source of water, a source of sodium, and a source of potassium; and
    b. allowing the mixture to react in the presence of carbon dioxide in the pressure vessel, wherein the mixture contains a carbonate-bicarbonate buffer pair, wherein the composition of the mixture as expressed in mole oxide ratios is $$\frac{Na_2O + K_2O}{Al_2O_3} = \text{approximately } 3.26$$

$$\frac{CO_3 + HCO_3}{Al_2O_3} = \text{approximately } 5.7$$

$$\frac{SiO_2}{Al_2O_3} = \text{approximately } 13.5$$

$$\frac{H_2O}{Al_2O_3} = \text{approximately } 130.4$$

wherein the mixture before reaction contained no ferrierite, and wherein the mixture is held at 230° C to 310° C for 3 to 101½ hours.

* * * * *